Frank T. Foshee
INVENTOR.

BY Wayland D Keith
His Agent.

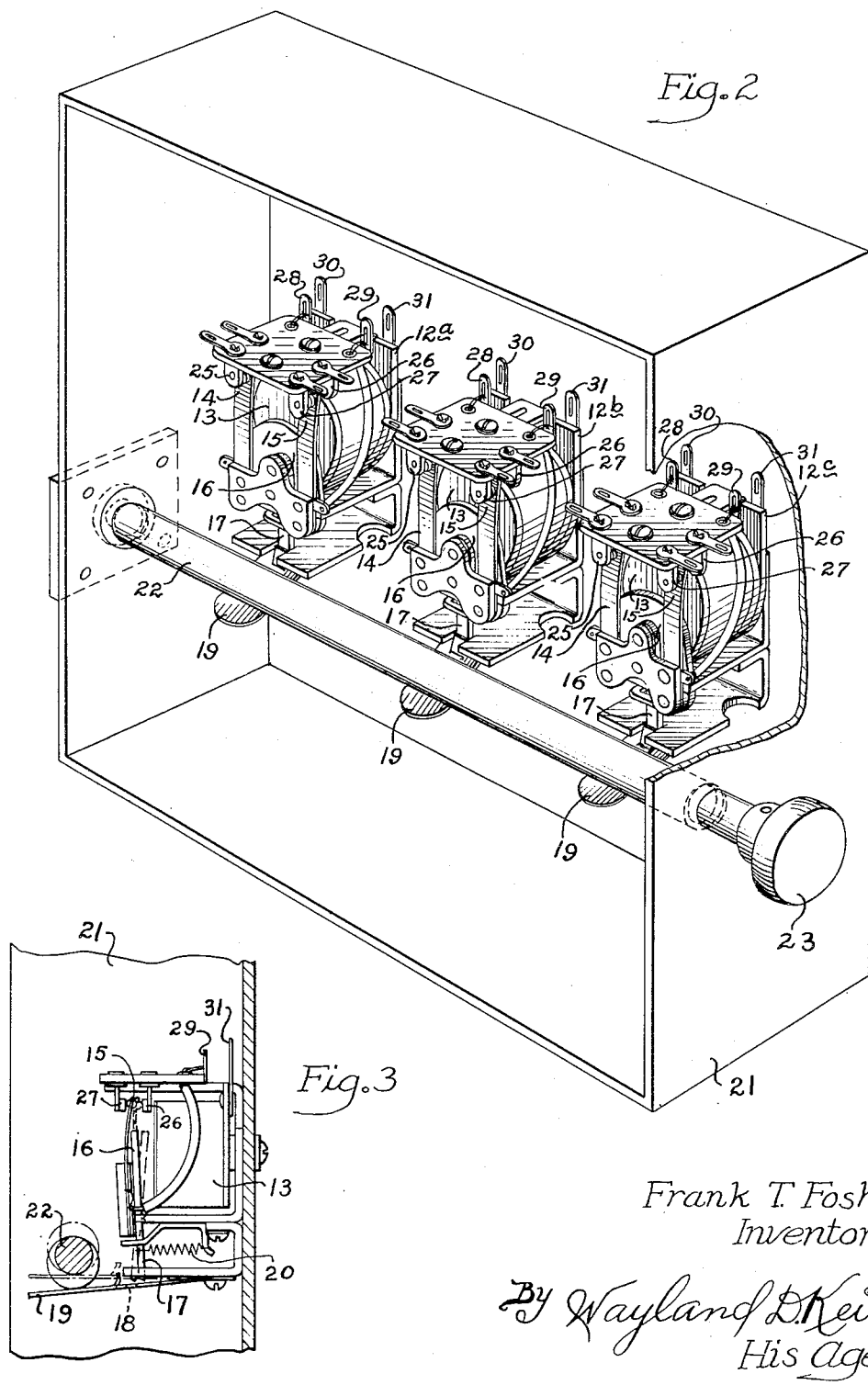

Patented July 10, 1951

2,559,913

UNITED STATES PATENT OFFICE 2,559,913

OVERCURRENT PROTECTIVE SYSTEM FOR MOTOR CIRCUITS

Frank T. Foshee, Fort Worth, Tex.

Substituted for abandoned application Serial No. 498,857, August 16, 1943. This application July 7, 1947, Serial No. 759,407

1 Claim. (Cl. 175—294)

This application is a substitute for my prior application filed August 16, 1943, Serial No. 498,857, now abandoned.

This invention relates to improvements in electric motor control circuits of the character used primarily for automatically interrupting the flow of electric current to the motor when one of the power lines, from the source of power, has been interrupted, as by the breaking of the circuit through a blown fuse.

In conventional three-phase motor installations three feeder lines are provided and each of these includes a fuse disconnect switch and a magnetic switch. In most instances such devices as nichrome coils, or the like are employed with bimetal thermostats to break the circuits when overloaded and thus shut off the motor. Such devices, however, are not sufficiently dependable to minimize the hazard of damage to the motor and prevent burning up the fields, the metal in which is both expensive and scarce.

It is of common knowledge that impairment of only a part of a three-phase motor circuit will not necessarily stop the motor but may cause the remainder of the circuit to become overloaded and result in damage thereto, or to the motor, before the impaired portion of the circuit could be restored to operative condition. Such a condition could exist in the blowing of a fuse in any one of the feeder lines to the circuit without immediate detection and great damage caused before repairs could be made.

While various forms of motor controls have been proposed heretofore, these have not been entirely satisfactory or practical for manufacture and use in controlling the circuits to the motor.

One object of the invention is to improve the construction of circuit controllers adapted especially for controlling the power line circuits of three-phase electric motors, which may be manufactured and assembled in a practical and inexpensive manner and without requiring undue complexity of assembly or hook-up in installation.

Another object of the invention is manifest in the provision of an electrical circuit for three-phase electric motors wherein certain conventional safety devices are augmented by apparatus calculated to prevent damage to the field windings of the motor by overheating caused by overloading the circuit resulting in great damage to the equipment and creating a fire hazard for both equipment and housing therefor.

A still further object of the invention resides in the provision of automatically actuated circuit breaking devices adapted to be installed in existing and operating circuits for improving the installations and removing therefrom the prevalent hazards in some of these which could result in serious damage and expensive shutdowns.

An object of the invention is that of affording a compact arrangement of parts which can be assembled in a minimum of space and encased within a compact cabinet or case and installed within ready access and visibility of the attendant.

Broadly, the invention seeks to comprehend the provision of an entirely automatic circuit breaking unit for shutting off the current to the motor circuit in which it is installed, and further to provide means for manually re-energizing the circuit after the impairment, such as a blown fuse, has been properly corrected.

The invention presupposes the provision of a wiring circuit which is designed to augment the conventional so-called safety devices for shutting off the current to electric motors and stopping the same to prevent damage, when the circuits are impaired by a blown fuse.

One embodiment of the invention is illustrated in the accompanying drawings in which:

Fig. 2 is a perspective view of a portion of the control unit, with parts broken away and in section to clarify the illustration.

Fig. 3 is a detail side elevation of one of the relay switches.

Figure 1:
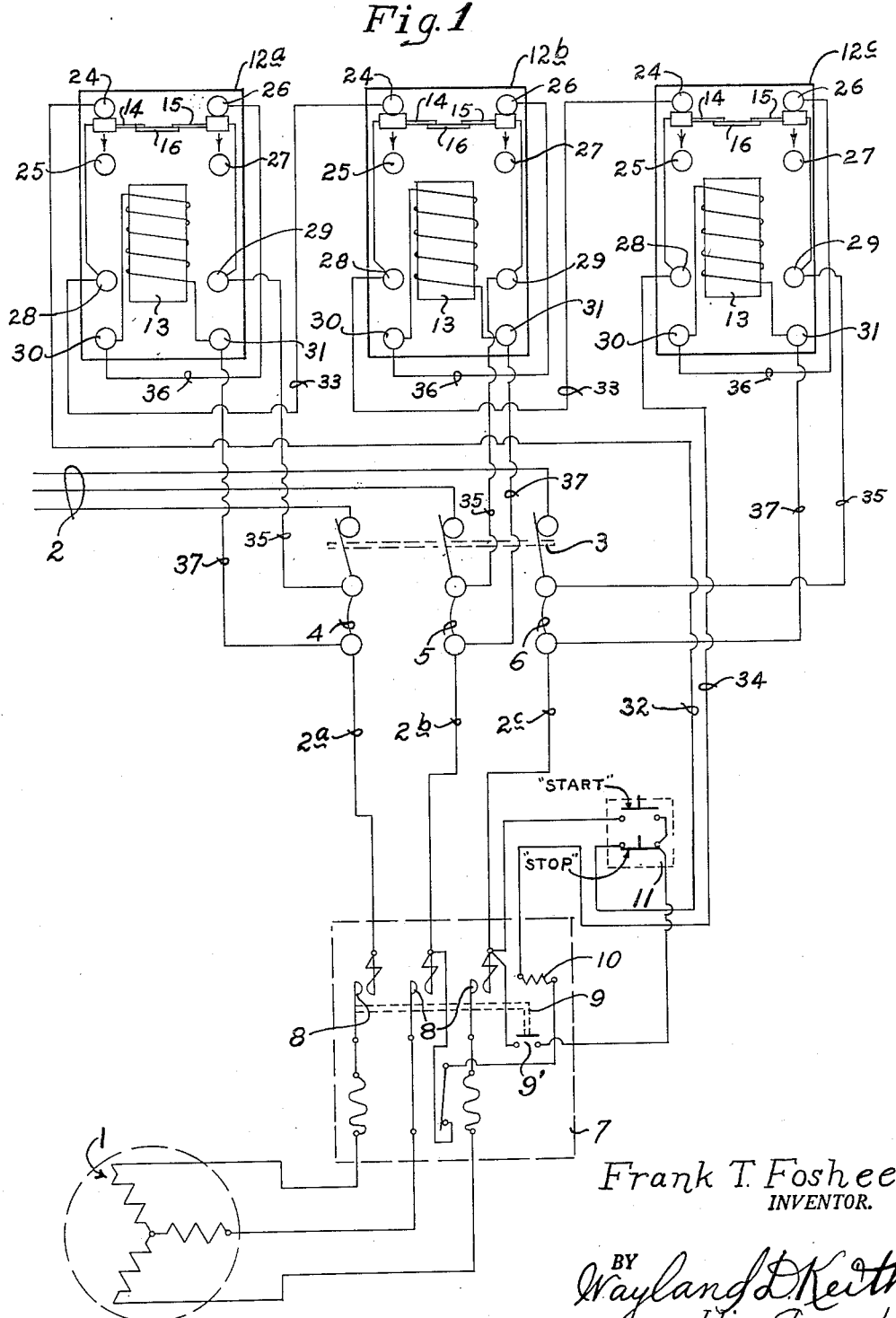
Fig. 1 is a diagrammatic view of the control circuit for the motor, showing the application of this invention thereto.

The invention is shown in Fig. 1 as applied to a conventional form of three-phase electric motor designated generally by the numeral 1, which is energized normally from a source of electric power through three feeder lines generally indicated at 2. The connection of the feeder lines to the motor is regulated by a manually set switch 3, which is normally closed during the operation of the motor.

Each of the feeder lines 2 has a fuse connected therein as indicated respectively at 4, 5 and 6 from which fused power line circuits 2a, 2b, and 2c extend to the field windings of the electric motor 1.

A magnetic switch of conventional or well known form usually is employed for connecting the feeder line circuits 2a, 2b, and 2c to the field windings of the motor, as indicated generally at 7. The structure of this switch 7 and its manner of operation are well understood in the art of electric motor installations and need not be described in detail. Any suitable magnetic control switch for the feeder circuits may be used as desired instead of the form here illustrated.

In the form illustrated, movable contacts 8 are adapted to close the circuits of the lines 2a, 2b and 2c. These contacts 8 are operated jointly by an insulated connector 9 actuated by a holding magnet 10, which is closed by magnetic action upon closing "start" switch 11.

A manually operated "start" and "stop" push button control switch is shown at 11, one side of which is connected in the circuit of the switch 9'. Normally the stop switch would be closed as illustrated in Fig. 1, and the start switch open, when the circuit is to be operated automatically. The start switch 11 is connected with one side of the line 2c, while the stop switch is in series with the circuit to the automatic controller, as hereinafter described.

The controls for the respective feeder circuits are provided by means of relays, one for each of the circuits 2a, 2b and 2c, designated generally at 12a, 12b, and 12c. These relays are identical to each other in the form shown although any suitable or desired form may be used if found convenient for the purpose.

Each of the relays comprises an electromagnetic coil 13 in position for attracting movable spring contacts 14 and 15 arranged side by side and carried on a movably mounted support 16 (Fig. 2). The support 16 has a depending finger 17 in position to engage in an orifice 18 (Fig. 3), formed in a spring catch 19. A spring 20 is connected with the finger 16 normally tending to move the contacts 14 and 15 to the positions thereof shown in Fig. 1.

The relays are adapted to be mounted in a housing as shown in Fig. 2 designated generally at 21, in side by side relation, with the spring catches 19 projecting in parallel relation. For jointly releasing the catches, I have shown and provided a control rod 22 extending through the housing 21 from side to side thereof and journaled for turning movement upon eccentric portions of the rod. A handle portion 23 is provided at one end of the rod 22 for turning the rod to release the spring catches.

The spring contact 14 alternates in its two positions between fixed contacts 24 and 25. Likewise, the spring contact 15 alternates between fixed contacts 26 and 27. Normally the contacts 14 and 15 are in engagement respectively with the contacts 24 and 26 when the solenoid coil 13 is deenergized. However, upon energizing of the solenoid coil, this will attract the support member 16 to move the contacts 14 and 15 into engagement respectively with the contacts 25 and 27.

The movable contacts 14 and 15 are connected with fixed contacts 28 and 29 of each relay. Additional fixed contacts 30 and 31 are provided on each relay connected at opposite ends of the relay coil 13.

One side of the stop switch 11 is connected through a line 32 leading therefrom to the contact 24 of the relay 12a. The contact 28 of each of the respective relays 12a and 12b is connected with the contact 24 of the next relay 12b and 12c respectively through a line 33. The contact 28 of the relay 12c is connected through a line 34 with the magnetic coil 10. The opposite side of the magnetic coil 10 is connected with the second-phase feeder line 2b.

The operation of the control circuit now will be evident. With the switch 3 closed and the fuses 4—6 functioning to transmit electric current from the three-phase power line circuit 2 to the feeder line circuits 2a, 2b and 2c, the motor 1 will be operated in the usual manner.

During such normal operation, the relay coils 13 are de-energized as explained above, and the contact springs 14 and 15 are in engagement with the respective contacts 24 and 26 of the relays. Consequently, the magnet 10 will be energized from the feeder line circuit 2b, through the coil 10, line 34, contacts 28, 14 and 24, and the connecting circuits 33 of the relays 12a, 12b and 12c, thence through the line 32 and switch 11 to the feeder line circuit 2c. This will be maintained so long as the motor is operating in the usual manner.

If any one of the fuses 4, 5 or 6 should be blown, the direct connection of the corresponding feeder line circuit is then broken at the fuse. The circuit then would be closed momentarily from the input side of the power line fuse, that has been blown, through a line 35 leading therefrom to the contact 29 of the corresponding relay, one such connection being provided for each of the three relays. This circuit will be closed momentarily from the input side of the blown fuse, through the line 35 to the contacts 29, 15 and 26, thence through a line 36 connected with the contact 30, relay coil 13, contact 31 and line 37 to the feeder line circuit 2a, 2b or 2c containing the blown fuse.

Current will be shunted around the blown fuse, through this line when the fuse has blown, and will be sufficient to energize the relay coil 13. This will attract the contact support 16 against the tension of the spring 20 (Fig. 3), to move the contacts 14 and 15 into engagement with the contacts 25 and 27. This will occur at the relay corresponding with the broken fuse of the feeder line circuit, but since the relays are connected in series with the circuit of the magnet 10, the breaking of this circuit by the attraction of the contacts 14 and 15 of any one of the relays will de-energize the magnet 10 and permit the spring contacts 8 of the switch 7 to be moved away from the corresponding fixed contacts, thereby breaking the power line circuits to the field coils of the motor 1. This occurs automatically when any one of the fuses becomes blown and prevents the operation of the motor by the other two feeder circuits, as has been permitted heretofore.

Moreover, the energizing of the relay coil 13 moving the spring contacts 14 and 15 to the positions shown in dotted lines in Fig. 3 moves the lower end of the finger 17 thereof into registry with the slot 18 in the spring catch 19, thereby allowing the spring catch to engage the finger in the manner shown in dotted lines, and preventing the contact springs from resuming their normal positions under the influence of the spring 20 until these are reset manually.

After the trouble has been corrected, or a fuse replaced and any other necessary repairs made, these relays may be reset by the operation of the thumb-engaging portion 23 of the control rod 22 which will be turned to depress the catches 19 and thereby release the fingers 17, permitting the springs 20 to return the spring contacts 14 and 15 to their normal positions.

While the invention has been illustrated and described in one embodiment, it is recognized that variations and changes may be made therein without departing from the invention except as specified in the claim.

I claim.

A control system for an electric motor within an electric circuit having a plurality of feeder lines, which feeder lines are controlled by fuses in the respective feeder lines, which control system includes a relay for each of said feeder lines, in which relay an electro-magnetic coil is connected in shunt circuit across each of said fuses, a pair of normally closed contact points within said shunt circuit, one of which contact points is mounted on a movable armature, which armature is within a magnetic field when said electro-magnetic coil is energized, said armature being movable to open said contact points in said shunt circuit upon energization of said electro-magnetic coil, a further control circuit connected in series with the stop circuit of a magnetic multi-pole start and stop switch in said feeder lines, which switch has a normally open contactor for momentarily closing a circuit to energize a magnetic holding coil in said magnetic multi-pole start and stop switch to hold said switch closed, a normally closed contactor within said stop circuit to break said circuit in which said magnetic multi-pole start and stop switch is disposed, said further control circuit having a pair of normally closed contact points for each relay and said pairs of contact points being connected in series, one contact point of each pair of said contact points in said further control circuit being mounted on said armature in each of said relays so said last mentioned contact points will open with said first mentioned contact points upon energizing said electro-magnetic coil so as to break said stop switch circuit to de-energize said holding coil to open said magnetic multi-pole start and stop switch so as to break all feeder line circuits leading to said motor, said electro magnetic coil being energizeable upon the breaking of the circuit by the opening of a fuse, and said fuses and said relays being in the feeder lines intermediate said magnetic multi-pole start and stop switch and the source of electricity.

FRANK T. FOSHEE.

REFERENCES CITED

The following references are of record in the file of this patent:

UNITED STATES PATENTS

| Number | Name | Date |
|---|---|---|
| 934,063 | Fontecha | Sept. 14, 1909 |
| 1,116,566 | Conrad | Nov. 10, 1914 |
| 1,134,752 | Leonard | Apr. 6, 1915 |
| 1,138,170 | Allgood | May 4, 1915 |
| 1,309,027 | Gilliett | July 8, 1919 |
| 1,660,965 | Hartzell | Feb. 28, 1928 |
| 1,800,256 | Keller | Apr. 14, 1931 |

FOREIGN PATENTS

| Number | Country | Date |
|---|---|---|
| 34,418 | Switzerland | May 31, 1905 |